(12) United States Patent
Tabarovsky et al.

(10) Patent No.: US 9,223,047 B2
(45) Date of Patent: Dec. 29, 2015

(54) FORMATION RESISTIVITY MEASUREMENTS USING PHASE CONTROLLED CURRENTS

(75) Inventors: Leonty A. Tabarovsky, Cypress, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 456 days.

(21) Appl. No.: 13/359,581

(22) Filed: Jan. 27, 2012

(65) Prior Publication Data
US 2013/0027045 A1 Jan. 31, 2013

Related U.S. Application Data

(60) Provisional application No. 61/469,939, filed on Mar. 31, 2011.

(51) Int. Cl.
*G01V 3/24* (2006.01)
*E21B 47/10* (2012.01)

(52) U.S. Cl.
CPC ............... *G01V 3/24* (2013.01); *E21B 47/102* (2013.01)

(58) Field of Classification Search
CPC ......... E21B 17/1078; G01V 3/24; G01V 3/20
USPC .................. 324/338–343, 347–375
See application file for complete search history.

(56) References Cited

U.S. PATENT DOCUMENTS

| 3,579,098 | A | | 5/1971 | Mougne |
|---|---|---|---|---|
| 4,019,125 | A | * | 4/1977 | Daniel .......................... 324/374 |
| 4,837,518 | A | | 6/1989 | Gard et al. |
| 5,056,067 | A | | 10/1991 | Drumheller |
| 5,869,968 | A | | 2/1999 | Brooks et al. |
| 6,225,806 | B1 | | 5/2001 | Millar et al. |
| 7,119,544 | B2 | | 10/2006 | Hayman et al. |
| 2001/0043066 | A1 | | 11/2001 | Hawkes et al. |
| 2002/0153897 | A1 | * | 10/2002 | Evans et al. .................. 324/374 |
| 2003/0122547 | A1 | | 7/2003 | Prammer |
| 2004/0046559 | A1 | | 3/2004 | Flanagan |

(Continued)

OTHER PUBLICATIONS

Notification of Transmittal of the International Search Report and the Written Opinion of the International Searching Authority, or the Declaration; PCT/US2011/058113; Jun. 29, 2012.

(Continued)

*Primary Examiner* — Arleen M Vazquez
*Assistant Examiner* — Brent J Andrews
(74) *Attorney, Agent, or Firm* — Cantor Colburn LLP

(57) ABSTRACT

Disclosed is an apparatus for estimating a property of an earth formation penetrated by a borehole. The apparatus includes a carrier configured to be conveyed through the borehole and having a first transmitter electrode configured to inject electrical current into the formation and a first measurement electrode configured to receive electrical current for measurement due to the current injection in order to estimate the property of the earth formation. A controller is configured to determine a phase difference between injected electrical current and received electrical current. A first bucker amplifier is coupled to the first measurement electrode and configured to apply a voltage to the first measurement electrode based on the determined phase difference in order for a phase of current received by the first measurement electrode to be substantially in phase with the current injected by the first transmitter electrode.

19 Claims, 3 Drawing Sheets

(56) References Cited

U.S. PATENT DOCUMENTS

| | | | |
|---|---|---|---|
| 2005/0067190 A1 | 3/2005 | Tabanou et al. | |
| 2005/0068036 A1* | 3/2005 | Wang et al. | 324/338 |
| 2006/0055418 A1 | 3/2006 | Ogilvy et al. | |
| 2007/0239403 A1* | 10/2007 | Hornbostel | 702/191 |
| 2007/0285073 A1* | 12/2007 | Nishida | 323/288 |
| 2008/0040042 A1 | 2/2008 | Page | |
| 2009/0072833 A1* | 3/2009 | Tabarovsky | 324/355 |
| 2009/0306896 A1 | 12/2009 | Forgang et al. | |

OTHER PUBLICATIONS

Notification of Transmittal of the International Search Report and the Written Opinion of the International Searching Authority, or the Declaration; PCT/US2012/031419; Oct. 31, 2012.

Notification of Transmittal of the International Search Report and the Written Opinion of the International Searching Authority, or the Declaration; PCT/US2012/031421; Oct. 31, 2012.

Notification of Transmittal of the International Search Report and the Written Opinion of the International Searching Authority, or the Declaration; PCT/US2012/031424; Nov. 1, 2012.

L. San Matin et al, Oil-Based Mud Imaging Tool Generates High Quality Borehole Images in Challenging Formation and Borehole Condition, Including Thin Beds, Low Resistive Formations, and Shales, Conference Paper, May 25-28, 2008, 5 pages, Society of Petrophysicists and Well-Log Analysts.

Lofts, J., A New Micro-Resistivity Imaging Device for Use in Oil-Based Mud, Conference Paper, 2002, 14 pages, Society of Petrophysicists and Well-Log Analysts.

Mezzatesta A.G. et al, Integrated 2-D Interpretation of Resistivity Logging Measurements by Inversion Methods, Conference Paper, 1995, 8 pages, Society of Petrophysicists and Well-Log Analysts.

Mezzatesta A.G. et al, Integrated Interpretation of Galvanic and Induction Measurements by Inversion Methods, Conference Paper, Mar. 11-14, 1995, 9 pages, Society of Petroleum Engineers.

Mezzatesta, A.G. et al, Simultaneous Inversion of Galvanic and Induction Logging Measurements to Improve Resolution, Conference Paper, Apr. 27-29, 1994, 15 pages, Society of Petroleum Engineers.

* cited by examiner

FORMATION RESISTIVITY MEASUREMENTS USING PHASE CONTROLLED CURRENTS

CROSS REFERENCE TO RELATED APPLICATIONS

This application claims the benefit of an earlier filing date from U.S. Provisional Application Ser. No. 61/469,939 filed Mar. 31, 2011, the entire disclosure of which is incorporated herein by reference.

BACKGROUND

1. Field of the Invention

The present invention relates to the analysis of underground earth formations, and, more particularly, to the determination of formation resistivity.

2. Description of the Related Art

Boreholes are drilled into the earth for many applications such as hydrocarbon production, geothermal production, and carbon sequestration. In order to efficiently use expensive resources drilling the boreholes, it is important for analysts to acquire detailed information related to the geologic formations being drilled.

Resistivity imaging is one type of process for obtaining the detailed information. In resistivity imaging, both electrical and induction resistivity instruments can be used. The resistivity of a formation is measured as a function of depth using a resistivity tool disposed in a borehole penetrating the formation. Variations in the resistivity are plotted or displayed to provide an image of the formation.

In electrical resistivity imaging, one or more transmitter electrodes are used to inject an electric current into an earth formation. Measurement electrodes, sometimes referred to as button electrodes, sink these currents and perform electrical measurements that are used to determine the resistivity of the earth formation. Because the transmitter and transmitter electrodes are deployed in a drilled borehole having variations in diameter due to the drilling process, the electrodes may not make contact with the borehole wall. The space or distance between an electrode and the borehole wall is referred to as the "standoff." Variations in the standoff could negatively affect quality of acquired resistivity images. Moreover, when using oil-based drilling mud, the drilling mud may enter a standoff and this could make measurement conditions even worse and result in erratic images. It would be well received in the art if the quality of resistivity images could be improved when using oil-based drilling mud.

BRIEF SUMMARY

Disclosed is an apparatus for estimating a property of an earth formation penetrated by a borehole. The apparatus includes a carrier configured to be conveyed through the borehole and having a first transmitter electrode configured to inject electrical current into the formation and a first measurement electrode configured to receive electrical current for measurement due to the current injection in order to estimate the property of the earth formation. A controller is configured to determine a phase difference between injected electrical current and received electrical current. A first bucker amplifier is coupled to the first measurement electrode and configured to apply a voltage to the first measurement electrode based on the determined phase difference in order for a phase of current received by the first measurement electrode to be substantially in phase with the current injected by the first transmitter electrode.

Also disclosed is a method for estimating a property of an earth formation penetrated by a borehole. The method includes: conveying a carrier through the borehole; injecting electrical current into the formation using a first transmitter electrode disposed at the carrier; receiving electrical current with a first measurement electrode disposed at the carrier due to the injecting; determining a phase difference between the injected electrical current and the received electrical current using a controller; applying a first voltage to the first measurement electrode based on the phase difference using a first bucker amplifier such that a phase of the received electrical current is substantially in phase with the injected electrical current; and measuring received electrical current substantially in phase with injected electrical current using a first measurement sensor coupled to the first measurement electrode to estimate the property.

Further disclosed is a non-transitory computer readable medium having computer executable instructions for estimating a property of an earth formation by implementing a method that includes: injecting electrical current into the formation using a first transmitter electrode; receiving electrical current using a first measurement electrode due to the injecting; determining a phase difference between the injected electrical current and the received electrical current; applying a first voltage to the first measurement electrode with a first bucker amplifier such that a phase of the received electrical current is substantially in phase with the injected electrical current; and measuring received electrical current substantially in phase with injected electrical current using a first measurement sensor coupled to the first measurement electrode to estimate the property.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
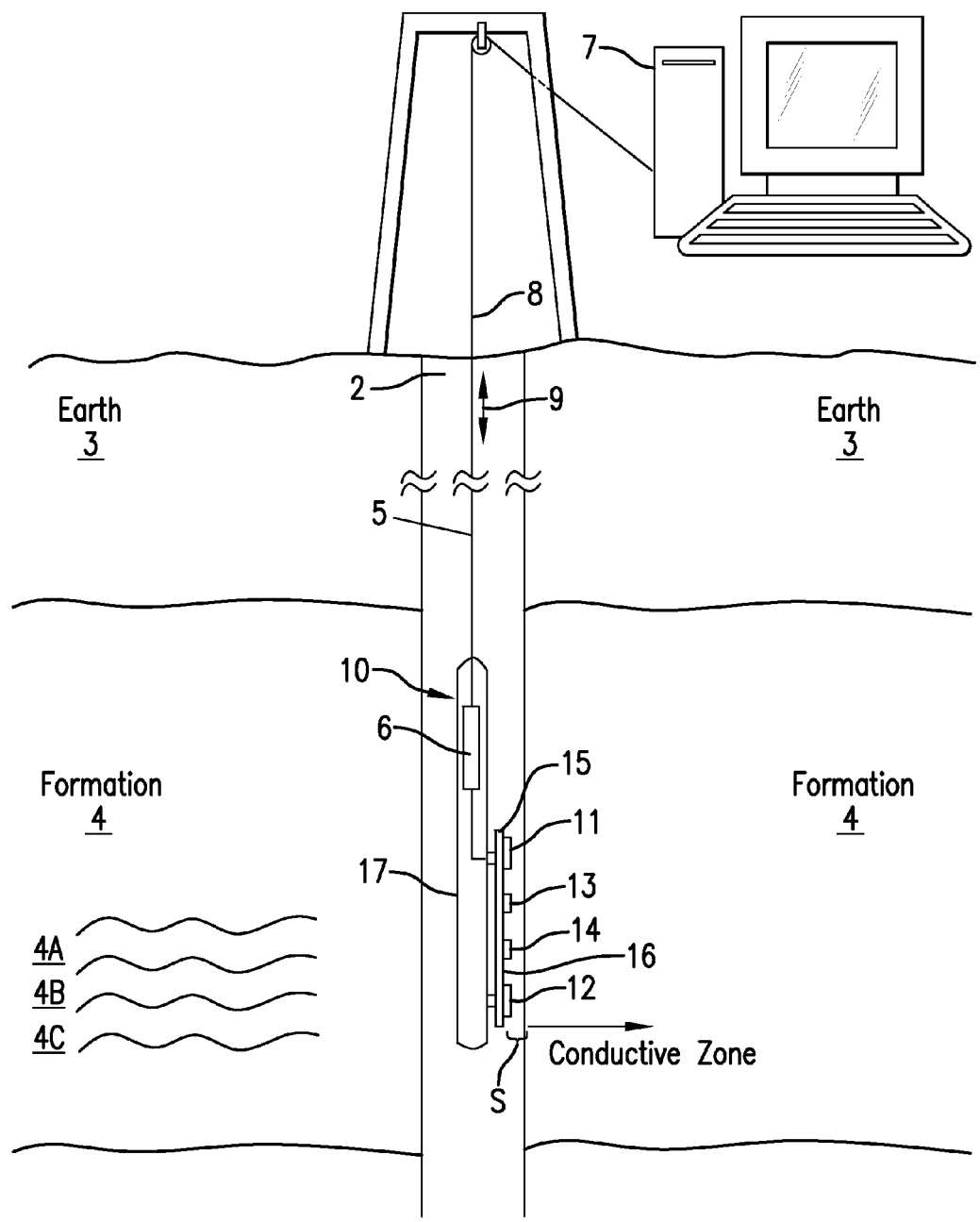
FIG. 1 illustrates an exemplary embodiment of a downhole resistivity tool disposed in a borehole penetrating the earth.

Reference may now be had to FIG. 1 illustrating an exemplary embodiment of a downhole tool 10 disposed in a borehole 2 penetrating the Earth 3, which includes an earth formation 4. The earth formation includes layers 4A, 4B, and 4C. The downhole tool 10 is conveyed through the borehole 2 by a carrier 5. In the embodiment of FIG. 1, the carrier 5 is an armored wireline 8. Besides supporting the downhole tool 10 in the borehole 2, the wireline 8 can also provide communications (e.g., data 9) between the downhole tool 10 and a computer processing system 7 disposed at the surface of the earth 3. In logging-while-drilling (LWD) or measurement-while-drilling (MWD) embodiments, the carrier 5 can be a drill string. In order to operate the downhole tool 10 and/or provide a communications interface with the computer processing system 7, the downhole tool 10 includes downhole electronics 6.

Still referring to FIG. 1, the downhole tool 10 is configured to measure the resistivity, or its inverse conductivity, of the formation 4. To measure the resistivity, the downhole tool 10 includes a first transmitter electrode 11, a second transmitter electrode 12, a first current measurement electrode 13 (also referred to as the first button electrode 13), and a second current measurement electrode 14 (also referred to as the second button electrode 14), all disposed on a pad 15. The electrodes 11-14 are separated by narrow insulating gaps 16. Because transmitter electrodes 11 and 12 are generally driven by the same transmitter electronics and thus are held at the same potential, the overall electrode configuration may be referred to as a two-button electrode configuration (i.e., referring to a transmitter electrode and button electrode). The pad 15, in one embodiment, is configured to be extended from the downhole tool 10 to make contact with the wall of the borehole 2. The portion of the wall of the borehole 2 at which resistivity measurements are performed may be referred to as a conductive zone due to electrical currents being injected and measured in this zone using the above-mentioned electrodes.

It can be appreciated that the downhole tool 10 can have a plurality of pads 15 symmetrically arranged about the tool 10 so that they can extend in unison to contact the wall and provide mutual support to each other to maintain minimal standoff from the wall.

The downhole tool 10 operating in boreholes filled with non-conductive oil-based drilling fluid can conduct measurements using alternating current to overcome impedance introduced by both "standoff" and mud invasion zone. The currents are injected by transmitter electrodes driven by a voltage source at frequency $f=\omega/2\pi$. Measurements are based on the sensing of that component of electric current flowing through the measurement electrodes that is in-phase with the signal of the voltage source. By convention, this in-phase component of the measured current is called the "real" component of the measured current. In addition, by convention, electrode separation from the borehole wall together with the above-mentioned invasion zone is referred to as tool "standoff," shown as S in FIG. 1. The electrode separation and the invasion zone are electrically connected in series and they both present high impedance to injected electrical current prior to it entering the geologic formation. Uneven standoffs of transmitter and measurement electrodes in a resistivity tool can cause erratic resistivity images in oil-based drilling mud.

Different standoffs between the measurement electrodes cause strong cross currents between the measurement electrodes that primarily affect the phase of the measured current. Alteration of the phase results in a leakage of the non-informative imaginary component of the current into the real component of the current, hence, causing inaccurate or erratic measurements of the resistivity.

Certain measurement techniques may be established for detection of formation resistivity independent of the oil-filled gap thickness, gap material resistivity, and other properties affecting the gap impedance. As one example, it is assumed that a return electrode (shown as tool mandrel 17) is very large compared to the transmitter and measurement electrodes 11-14 such that the ground impedance to the return may be neglected.

Figure 2:
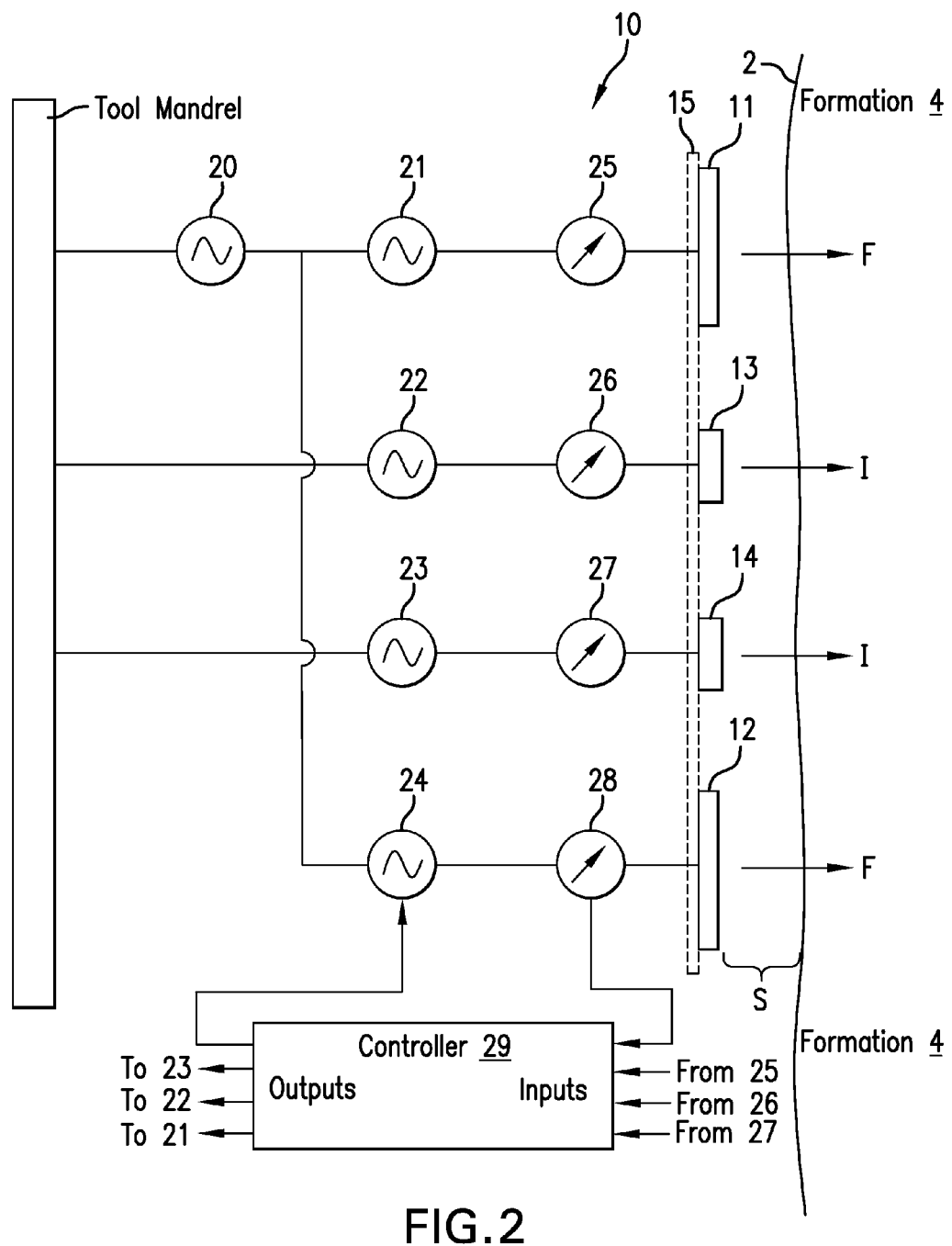
FIG. 2 depicts aspects of the downhole resistivity tool.

Reference may now be had to FIG. 2 depicting aspects of the downhole tool 10 using the two-button configuration and incorporating measurement techniques for detection of formation resistivity independent of standoff effects. A voltage V applied by a voltage source 20 to the transmitter electrodes 11 and 12 allows electrical current F from the periphery of the pad 15 to be injected into the formation 4. After passing through the formation 4, the current F returns back to the pad 15 and different portions of this current sink through the button electrodes 13 and 14. Sensors 26 and 27 coupled to button electrodes 13 and 14, respectively, measure currents flowing through the button electrodes 13 and 14 or electrical quantities related to those currents. Similarly, sensors 25 and 28 coupled to the transmitter electrodes 11 and 12, respectively, measure currents flowing through the transmitter electrodes 11 and 12 or electrical quantities related to those currents. The sensors 25-28 are configured to provide output that is related to amplitude and phase of the measured signal.

In general, all electrical quantities depend on different voltage drops and phase delays along the current flow path. Both voltage drops and phase delays are functions of the overall system that includes the tool design, the standoff impedance and the formation resistivity. Because of the phase delays, currents measured by the button electrodes 13 and 14 have to be referenced to a reference parameter such as current flowing through the transmitter electrodes 11 or 12. However, if a measured current is in phase with the transmitted current, then changes in the standoff effects between the transmitter electrode(s) and the measurement electrode(s) are balanced or canceled out and the current measurement is related to the resistivity of the formation. In this manner the downhole tool 10 automatically compensates for any gap variations to provide measurements that are much more sensitive to formation resistivity.

In order to drive the measured currents in phase with the transmitted currents, bucker amplifiers 21-24 are coupled to electrodes 11-14, respectively. The bucker amplifiers are configured to apply voltage to the associated electrodes such that the measured currents are in phase with the transmitted current. A controller 29 is coupled to the sensors 25-28 and is configured to acquire the data regarding a measured phase of each measured current. The controller 29 is also configured to provide output to each of the bucker amplifiers 21-24. The outputs signal a voltage that each of the bucker amplifiers is to apply to its associated electrode.

The controller 29 includes a control algorithm, which may be implemented by analog and/or digital circuits. The control algorithm determines if a phase difference exists between the measured current and the transmitted current. If the phase difference is substantially zero, then none of the bucker amplifiers is needed to apply a bucking voltage (i.e., the bucking voltage is zero). If the phase difference is non-zero, then the control algorithm determines the magnitude and sign of the phase difference. The magnitude and sign are used to vary or set voltages applied to one or more of the measurement electrodes 13 and 14 and/or transmitter electrodes 11 and 12 in order for the phase of current measured in one or more button electrodes to be in phase with current transmitted from one or more transmitter electrodes. The control algorithm can be predefined or it can be adaptive and learn from previous control experience. In one embodiment, the controller 29 includes a Kalman filter in order to overcome phase measurements that include noise and other inaccuracies associated with downhole measurements and calculate more accurate control signals.

Figure 3:
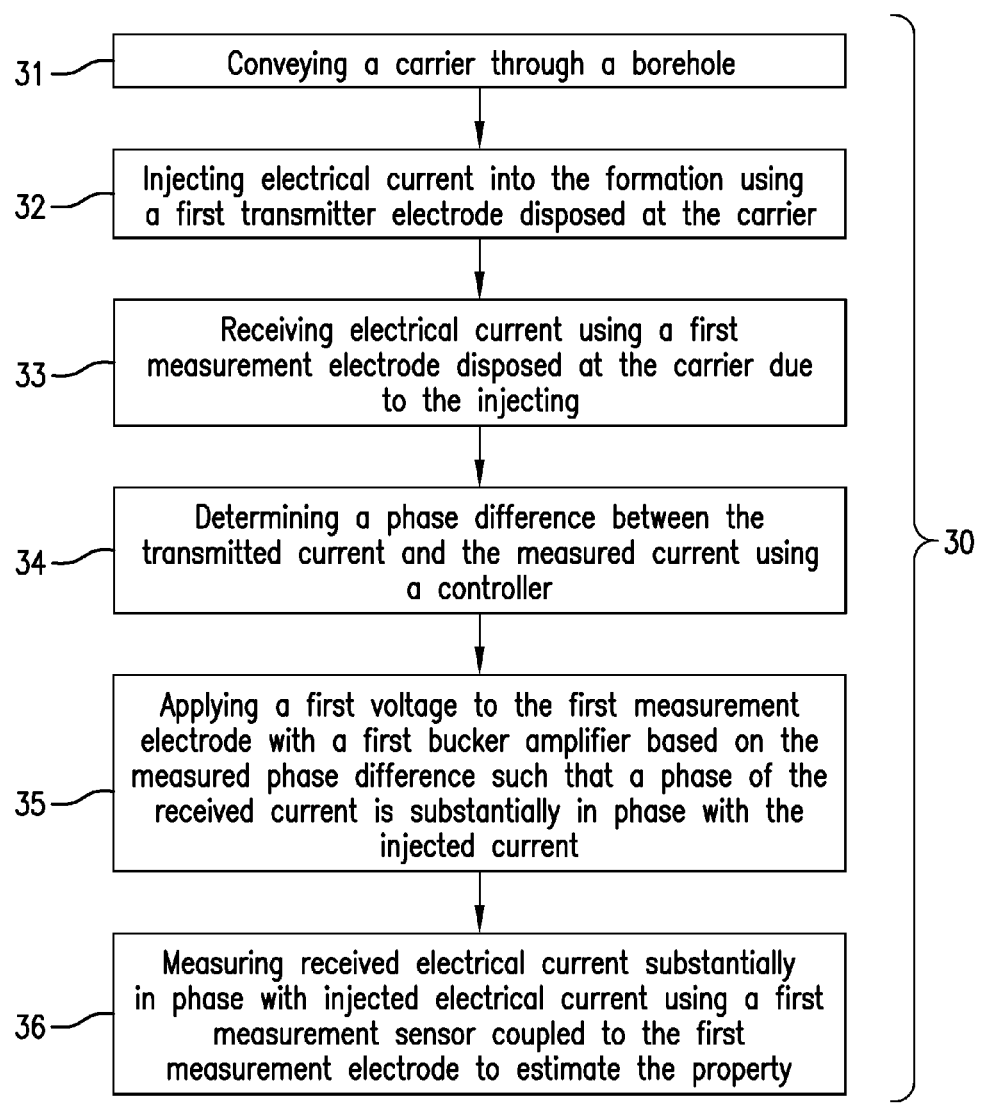
FIG. 3 presents one example of a method for estimating a property of an earth formation.

FIG. 3 presents one example of a method 30 for estimating a property of an earth formation penetrated by a borehole. The method 30 calls for (step 31) conveying a carrier through the borehole. Further, the method 30 calls for (step 32) injecting electrical current into the formation using a first transmitter electrode disposed at the carrier. Further, the method 30 calls for (step 33) receiving electrical current using a first measurement electrode disposed at the carrier due to the injecting. Further, the method 30 calls for (step 34) determining a phase difference between the transmitted current and the measured current using a controller. Further, the method 30 calls for (step 35) applying a first voltage to the first measurement electrode with a first bucker amplifier based on the measured phase difference such that a phase of the received current is substantially in phase with the injected current. Further, the method 30 calls for (step 36) measuring received electrical current substantially in phase with injected electrical current using a first measurement sensor coupled to the first measurement electrode to estimate the property.

In support of the teachings herein, various analysis components may be used, including a digital and/or an analog system. For example, the downhole electronics 6, the computer processing system 7, or the controller 29 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second," "third" and "fourth" are used to distinguish elements and are not used to denote a particular order. The term "couple" relates to a first device being coupled directly to a second device or indirectly through an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for estimating a property of an earth formation penetrated by a borehole, the apparatus comprising:
   a carrier configured to be conveyed through the borehole;
   a first transmitter electrode disposed at the carrier and configured to inject electrical current into the earth formation;
   a first measurement electrode disposed at the carrier and configured to receive electrical current from the formation for measurement due to the current injection in order to estimate the property of the earth formation;
   a first measurement sensor coupled to the first measurement electrode and configured to measure electrical current amplitude and phase of the electrical current received by the first measurement electrode;
   a controller coupled to the first measurement sensor and configured to determine a phase difference between injected electrical current and received electrical current and to estimate the property using measured electrical current that is in-phase with the injected electrical current; and
   a first bucker amplifier coupled to the first measurement electrode and configured to inject an electrical current into the first measurement electrode based on the determined phase difference to create zero phase difference between the electrical current injected at the first transmitter electrode and the electrical current received by the first measurement electrode in accordance with a control algorithm implemented by the controller, wherein the control algorithm determines if a phase difference exists between the measured current and the transmitted current and determines the magnitude and sign of the phase difference if the phase difference is non-zero.

2. The apparatus according to claim 1, further comprising a voltage source coupled to the first transmitter electrode and configured to apply voltage at a frequency to the first transmitter electrode for injecting the electrical current into the earth formation.

3. The apparatus according to claim 2, further comprising a first transmitter sensor coupled to the first transmitter electrode and to the controller and configured to detect a phase of the electrical current injected by the first transmitter electrode.

4. The apparatus according to claim 3, wherein the controller is coupled to the first measurement sensor, the first transmitter sensor, and the first bucker amplifier and configured to receive the measured electrical current phase and the injected electrical current phase and output a signal to the first bucker amplifier in order for the measured electrical current phase to be substantially equal to the injected electrical current phase.

5. The apparatus according to claim 4, wherein the controller is configured to implement adaptive control.

6. The apparatus according to claim 4, wherein the controller comprises a Kalman filter configured to overcome noise in current measurements and to calculate a more accurate control signal than without the Kalman filter.

7. The apparatus according to claim 4, further comprising a second measurement electrode coupled to a second bucker amplifier a second measurement sensor, wherein the second measurement electrode and the second measurement sensor are configured to measure electrical current to estimate the property of the earth formation and the second bucker amplifier is configured to inject electrical current into the second measurement electrode to create zero phase difference between current injected by the first transmitter electrode and current received by the second measurement electrode.

8. The apparatus according to claim 7, further comprising a second transmitter electrode configured to inject electrical current into the earth formation and to focus measured electrical current into the earth formation in conjunction with the first transmitter electrode.

9. The apparatus according to claim 8, further comprising a third bucker amplifier coupled to the first transmitter electrode and a fourth bucker amplifier coupled to the second transmitter electrode and configured to to inject electrical current to create zero phase difference between current injected by at least one of the first and second transmitter electrodes and current received by at least one of the first and second measurement electrodes.

10. The apparatus according to claim 9, wherein the first measurement electrode is disposed a first measurement standoff from a conductive zone in the formation and the second measurement electrode is disposed a second measurement standoff from the conductive zone, the first standoff being different from the second standoff.

11. The apparatus of claim 10, wherein the first transmitter electrode and the second transmitter electrode comprise three or more transmitter electrodes.

12. The apparatus of claim 10, wherein the first measurement electrode and the second measurement electrode comprise three or more measurement electrodes.

13. The apparatus of claim 1, wherein the borehole is filled with oil-based drilling mud.

14. The apparatus according to claim 1, wherein the property is resistivity or its inverse conductivity.

15. The apparatus according to claim 1, wherein the property is a boundary between layers of the formation.

16. The apparatus according to claim 1, wherein the carrier comprises at least one of a wireline, a slickline, a drill string, and coiled tubing.

17. A method for estimating a property of an earth formation penetrated by a borehole, the method comprising:
conveying a carrier through the borehole;
injecting electrical current into the formation using a first transmitter electrode disposed at the carrier;
receiving electrical current from the formation with a first measurement electrode disposed at the carrier due to the injecting;
measuring electrical current amplitude and phase of the electrical current received by the first measurement electrode using a first measurement sensor;
determining a phase difference between the injected electrical current and the received electrical current using a controller;
injecting electrical current into the first measurement electrode based on the phase difference determined by the controller using a first bucker amplifier to create zero phase difference between the electrical current injected at the first transmitter electrode and the electrical current received by the first measurement electrode in accordance with a control algorithm implemented by the controller, wherein the control algorithm determines if a phase difference exists between the measured current and the transmitted current and determines the magnitude and sign of the phase difference if the phase difference is non-zero; and
measuring received electrical current substantially in phase with injected electrical current using a first measurement sensor coupled to the first measurement electrode to estimate the property.

18. The method according to claim 17, further comprising injecting an electrical current into a second measurement electrode using a second bucker amplifier coupled to the second measurement electrode to create zero phase difference between current injected by the first transmitter electrode and current received by the second measurement electrode and measuring the in-phase electrical current received by the second measurement electrode to estimate the property.

19. A non-transitory computer readable medium comprising computer executable instructions for estimating a property of an earth formation by implementing a method comprising:
injecting electrical current into the formation using a first transmitter electrode;
receiving electrical current from the formation using a first measurement electrode due to the injecting;
measuring electrical current amplitude and phase of the electrical current received by the first measurement electrode using a first measurement sensor;
determining a phase difference between the injected electrical current and the received electrical current using a controller;
injecting electrical current into the first measurement electrode with a first bucker amplifier based on the phase difference determined by the controller to create zero phase difference between the electrical current injected at the first transmitter electrode and the electrical current received by the first measurement electrode in accordance with a control algorithm implemented by the controller, wherein the control algorithm determines if a phase difference exists between the measured current and the transmitted current and determines the magnitude and sign of the phase difference if the phase difference is non-zero;
measuring received electrical current substantially in phase with injected electrical current using a first measurement sensor coupled to the first measurement electrode to estimate the property.

* * * * *